United States Patent
Shukla et al.

(10) Patent No.: US 8,065,742 B2
(45) Date of Patent: Nov. 22, 2011

(54) DELIVERING SPECIFIC CONTENTS TO SPECIFIC RECIPIENTS USING BROADCAST NETWORKS

(75) Inventors: Rahul Shukla, Karnataka (IN); Ajay Gupta, Karnataka (IN); Vaibhav Rajan, Renens VD (CH)

(73) Assignee: Hewlett-Packard Development Company, L.P., Houston, TX (US)

( * ) Notice: Subject to any disclaimer, the term of this patent is extended or adjusted under 35 U.S.C. 154(b) by 865 days.

(21) Appl. No.: 11/997,904

(22) PCT Filed: Oct. 30, 2005

(86) PCT No.: PCT/IN2005/000344
§ 371 (c)(1),
(2), (4) Date: Feb. 5, 2008

(87) PCT Pub. No.: WO2007/017887
PCT Pub. Date: Feb. 15, 2007

(65) Prior Publication Data
US 2010/0166185 A1 Jul. 1, 2010

(51) Int. Cl.
*G06F 7/04* (2006.01)

(52) U.S. Cl. .......................................... 726/28

(58) Field of Classification Search .................. None
See application file for complete search history.

(56) References Cited

U.S. PATENT DOCUMENTS

2002/0044763 A1* 4/2002 Wehmeyer et al. ............. 386/83
2005/0100113 A1* 5/2005 Corts et al. .................... 375/295

FOREIGN PATENT DOCUMENTS

WO 9967904 12/1999

* cited by examiner

*Primary Examiner* — Brandon Hoffman

(57) ABSTRACT

Systems and methods for delivering specific contents to specific recipients using broadcast networks. The methods include receiving an AV signal of a broadcast program and supplementary content which contains a tag identifying a specific recipient and specific contents. The specific contents are encrypted with a public key associated with the specific recipient. The supplementary content is combined with the AV signal to form a data-augmented signal which is subsequently encoded and modulated with a carrier signal to form a transmit signal for broadcasting to receivers. Each receiver includes a supplementary decoder for extracting the supplementary content, decrypting the specific contents with a private key corresponding to the public key, and providing the decrypted specific contents to the intended recipient.

19 Claims, 8 Drawing Sheets

DELIVERING SPECIFIC CONTENTS TO SPECIFIC RECIPIENTS USING BROADCAST NETWORKS

FIELD OF INVENTION

The present invention relates to systems and methods for delivering electronic data. More specifically, it relates to systems and methods for delivering specific contents to specific recipients using broadcast networks such as television and radio.

BACKGROUND

Television and radio broadcasting technologies are well suited for providing contents to audience (i.e. viewers and listeners) on a mass scale. In developing countries, televisions and radios provide the largest audience base among all the entertainment media. Businesses are also heavily using radio and television networks to advertise their products in the most cost effective way to reach the masses in developing countries where TV/radio broadcast networks have wider reach compared to the traditional print media or the Internet. Government entities also use radio and television broadcasts to reach as many people as possible in conveying information or warning of an impending dangerous condition.

While TV/radio broadcast networks have wide reach and are a cost effective way for providing program contents to the general public, they are not able to deliver specific contents to specific audience. In real-life, there are many scenarios, which require specific contents to be delivered to specific users using broadcast media like TV/radio. For example, currently in India and several other countries, there are TV programs where a TV host calls up a person on the phone and asks the person some questions. If the person answers the questions correctly, he/she is declared a winner and is promised to be given gift-vouchers, which are delivered to the person by post. This method has numerous disadvantages but one major disadvantage is that of delay. Therefore, it is desirable to provide systems and methods using broadcast networks which can deliver specific contents an intended recipient substantially instantaneously and in a cost effective manner.

BRIEF DESCRIPTION OF THE DRAWINGS

Embodiments of the present invention are herein described, purely by way of example, with reference to the accompanying drawings, in which.

DETAILED DESCRIPTION

Figure 1A:
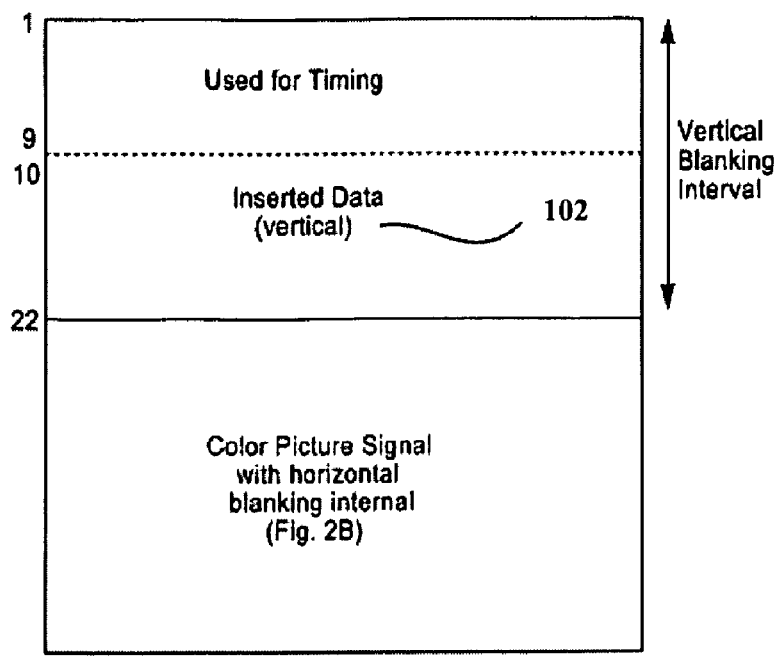
FIG. 1A illustrates the location of a vertical blanking interval in a conventional broadcast television signal employed in an embodiment of the present invention.

Methods and systems for delivering specific contents to a specific audience are described hereinafter with references to FIGS. 1-6. For clarity and convenience, the following definitions are used herein:

The term "data-augmented AV signal" refers to an AV signal of a television program content or an audio signal of a radio program content (hereinafter generally referred to as AV signal) which has "supplementary content" added to the AV signal. The data-augmented AV signal has the format of the original television or radio AV signal. Typically, the supplementary content is inserted into "a non-program portion" of the AV signal while the program content is carried in a program portion of the AV signal.

The term "supplementary content" refers to a document containing information relating to the program content of the AV signal of a television or radio broadcast program. The information or data can be, for example, mobile phone ringtones, music, games, pictures, video clips, audio clips, general information, which are associated with the program content. The supplementary content is able to be printed on a printer, reproduced or rendered on an electronic device such as PDA, or stored in a data storage device such as memory of PDA, in an embodiment, substantially concurrently with the rendering of the program content. The supplementary content can also contain other electronic contents. Furthermore, the supplementary content may contain mixed types of content, that is, the supplementary content may have two parts, where one part is ring-tone and the other is lyrics associated with a music video.

The description "non-program portion" refers to the portion of the AV signal which is reserved for conveying information or data other than the program content. Typical embodiments of the non-program portion of the AV signal include the vertical blanking interval (VBI) of an analog television signal or an equivalent signal portion of digital television broadcast signal (referred to as DVB-VBI and DVB-TXT in the Digital Video Broadcast (DVB) Standard), as well as equivalents in digital radio broadcasting (e.g. the programming associated data channel in a digital audio broadcast signal).

The term "conventional broadcast receiver" refers to radio and television receivers or sets which are primarily dedicated to the function of receiving radio and television broadcasts, respectively. A conventional broadcast receiver typically has a demodulation circuit operable to extract program content from the data-augmented AV signal which has the same format as the conventional AV signal.

"Conventional radio receivers" within this definition include digital audio radio receivers as described below.

Other digital and analog receivers operable to extract program content from a radio broadcast signal may be employed in alternative embodiments. As used herein, the term "conventional television set" refers to conventional analog television sets, such as those configured to process television broadcast signals transmitted in NTSC format, using, for example, North American Basic Teletext (NABTS), PAL and SECAM broadcast formats, using, for example, the European Broadcast Union (EBU) Teletext Standards described in DVB-VBI and DVB-TXT. In a further embodiment, the term "conventional television set" includes digital televisions receivers, such as those operable to process HDTV broadcasts using, for example, the Vertical Ancillary Data (VANC), and the like standards. Notwithstanding specific references made herein, the term "conventional television set" extends to television sets primarily operable to receive and process broadcast signals, regardless of when it is developed, which employ a non-program portion of the AV signal onto which the supplementary content can be inserted.

The term "conventional" as used with regard to broadcast, radio, or television receivers/sets refers to the primary functionality of the broadcast receiving system as described, and does not refer to the timing of when such a broadcast system was developed or deployed, which may be at any time during the past, present or future.

Television Data-Augmented AV Signal

In analog television broadcasting, program content of a television program is provided in the form of an AV signal, which includes a program portion and non-program portion in each frame. The program portion is used for carrying program content, while the non-program portion is used for carrying additional information or data such as the vertical and horizontal traces information. In the television broadcast standard, the non-program portion of the AV signal is typically the vertical blanking interval (VBI) found in each frame of the AV signal.

More recently, a variety of digital video broadcast (DVB) standards are also used for broadcasting programs via satellite (DVB-S), cable (DVB-C), terrestrial (DVB-T). For handheld and mobile receiver terminals, DVB-H standard is proposed which caters for broadcast signal reception on low complexity handheld devices. Similar to the VBI in the analog AV signals, DVB broadcast signals also allow the simulcasting of supplementary content or data using DVB-TXT or DVB-VBI standard. When a digital broadcasting system is employed, the DVB-TXT/DVB-VBI is used to deliver the supplementary content as described in the foregoing. For convenience, the description "vertical blanking interval" refers to the vertical blanking interval (VBI) of the analog broadcast television signal, as well as the equivalent non-program portion of the digital broadcast television signals.

FIG. 1A illustrates the location of a VBI in a conventional television broadcast signal employed in the embodiments. A standard PAL television signal consists of 625 horizontal lines (575 lines in NTSC standard employed in North America) which are divided into two fields of 312.5 lines each. The VBI makes up the first 21 lines of each field. Lines 1 to 9 are typically used for timing setup and lines 10 to 21 are available for carrying data 102. Each VBI line, using the PAL analog system which employs WST standard for VBI data insertion, is capable of carrying 45 bytes or 360 bits (one packet). At 50 fields per second, 12 VBI lines per field translate into a raw data rate transmission of 216 Kbits per second. However, ensuring data integrity requires forward error correction and other uses and this reduces the data throughput to about 124 Kbits per second. This level of throughput is sufficient to convey supplementary contents.

Figure 1B:
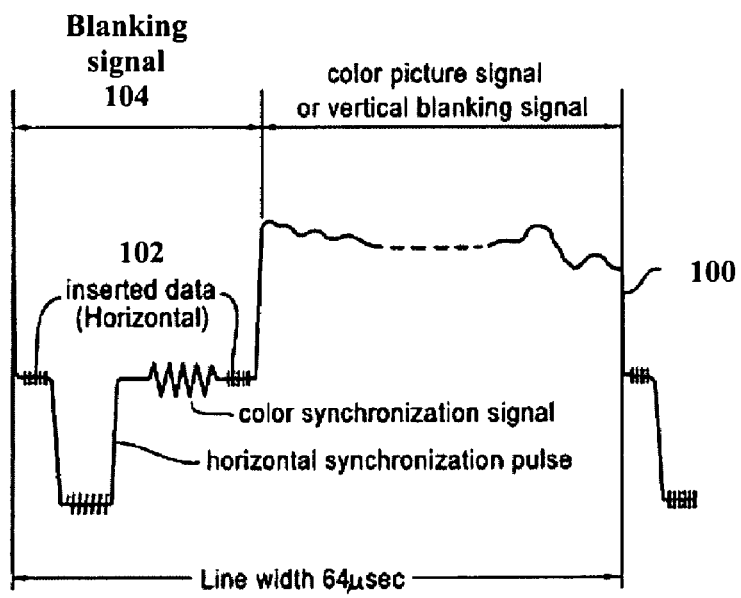
FIG. 1B illustrates the location of a horizontal blanking interval in a conventional broadcast television signal employable in an embodiment of the present invention.

FIG. 1B illustrates the location of a horizontal blanking interval (HBI) in an analog television AV signal 100 which may also be employed in the embodiments instead of the VBI. Data 102 which is inserted into the horizontal blanking interval 104 is not displayed on the television screen along with the program content, as the television tuner processes only the program content embedded in the other portions of the television AV signal 100. Accordingly, references made to VBI herein also extend to HBI.

In a teletext system, a separate channel of information is formed by inserting various types of information, such as news, sports, advertisements, and so on, in the VBI of the television AV signal 100. Typically, the various types of information do not have any correlation with the particular program content of the television AV signal 100. In an embodiment, the VBI is utilized to transport supplementary content specific to the program content of the particular television AV signal 100. In a further embodiment, the supplementary content inserted in the VBI represents a supplementary content associating with the program content embedded in adjacent program portion of the AV signal. In this way, each program segment may have a different supplementary content associated therewith and the supplementary content can be accessed almost concurrently with the rendering of the program content segment at the conventional television set.

Figure 2A:
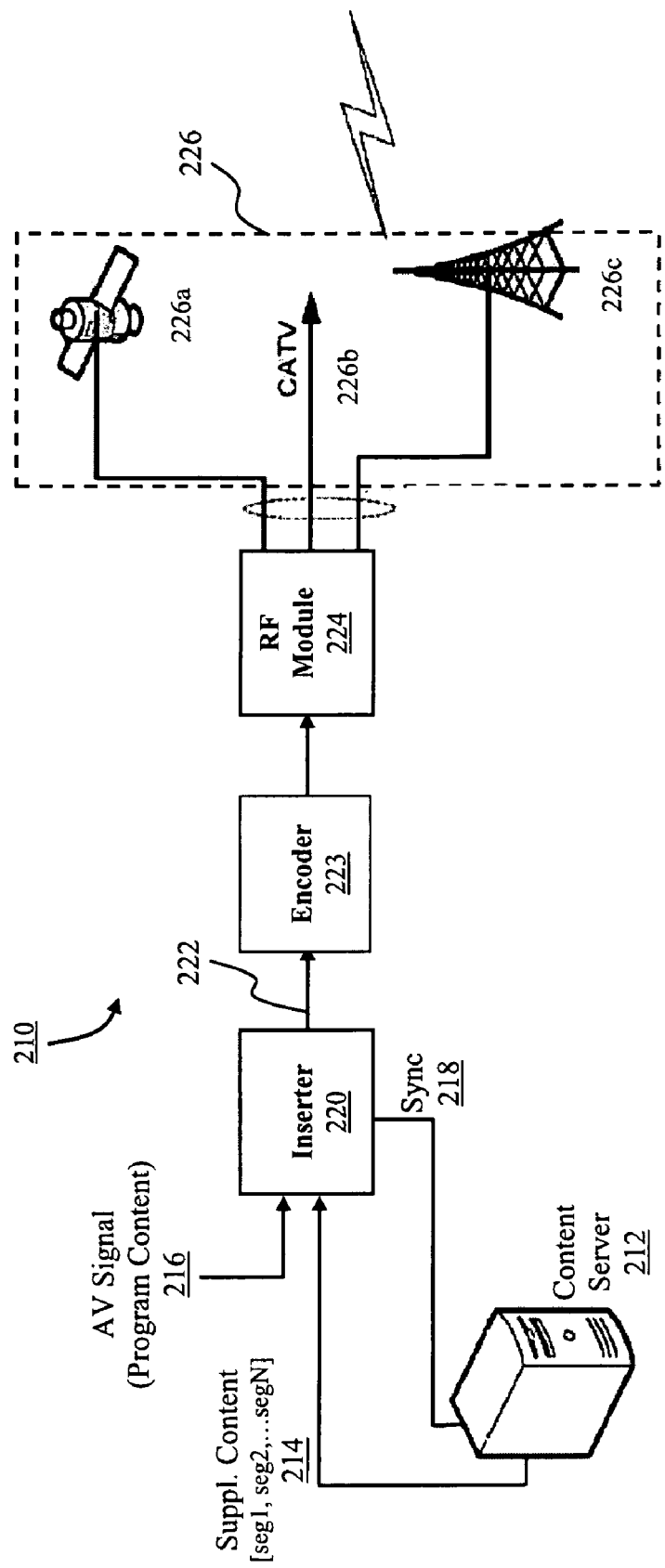
FIG. 2A illustrates a system for providing a data-augmented AV signal in accordance with an embodiment of the present invention.
Figure 2B:
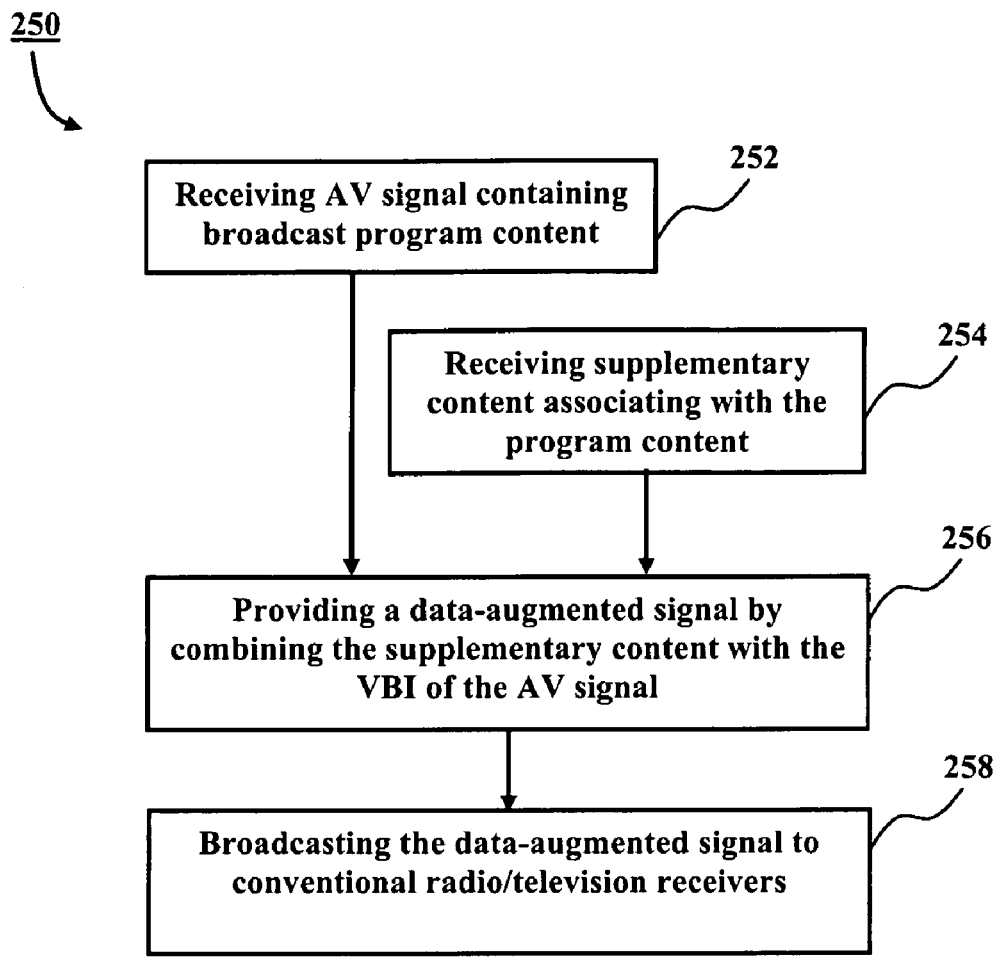
FIG. 2B illustrates a method of providing a data-augmented AV signal in accordance with an embodiment of the present invention.

An embodiment of a system 210 and corresponding method 250 for providing data-augmented AV signals are respectively illustrated in FIGS. 2A and 2B. Referring first to the system 210 illustrated in FIG. 2A, the system 210 includes a content server 212, an inserter 220, an RF module 224, and a transmitter 226, which may include a satellite transmitter 226a, a cable television transmitter 226b, or a transmitting tower 226c. These transmitting means are only for illustrations, other transmitter embodiments will be apparent to those skilled in the art.

The content server 212 is operable to provide supplementary content 214 which is associated solely with a program content conveyed in an AV signal 216 provided to the inserter 220. The supplementary content 214 may further include information concerning the program content, such as additional facts, figures or other data, contact information such as a telephone number, physical or email addresses, and similar information specific to the broadcast program content. Further, identifying information such as the version number, size, copyright/digital-right status, author and language of the supplementary content may be included. Additionally, program-specific advertiser or sponsor information may be included in the supplementary content 214. For example, information such as a list of manufacturers who provide cooking equipment shown in a cooking program.

In another embodiment, the supplementary content 214 may include interactive information designed to create an interactive session with the television viewers. Such information may include viewer queries regarding the content of the broadcast program, and which invites a response thereto. Those skilled in the art will appreciate that other types of supplementary content may be included.

The supplementary content 214 may be parsed into two or more segments with each segment corresponding to a different segment of the program content as conveyed in the AV signal 216. For example, a cooking show may describe the processes of preparing several different dishes. The supplementary content 214 may accordingly include different content segments which include details regarding recipes, recommended cooking times, and so on for the different dishes. The content segments are accordingly sequenced so that the supplementary content conveyed therein is synchronized with the corresponding segments of the program content received by the inserter 220. This process may be facilitated by the use of a synchronization signal 218 communicating between the content server 212 and the inserter 220.

In an embodiment, the supplementary content 214 is organized into a structured document, such as an extensible markup language (XML) document. As such, the supplementary content 214 includes meta-data which is tagged using a proprietary, known or broadcast industry adopted tags and fields. For example, identification of an advertiser or sponsor associated with one or more segments of the supplementary content may be identified using a meta-data tag "Sponsor ID". Other meta-data tags corresponding to additional information may also be used. For example, meta-data tag "Lang ID" may be used to identify the language of the supplementary content, "Date ID" tag to identify the composition date of the supplementary content, "DRM ID" tag to identify digital rights management information, "Exp ID" tag to identify an expiration date of the supplementary content, and "Enc ID" to identify encryption information applied to the supplementary content. The aforesaid tags represent only a small sample of the possible meta-data tags and types of information which can be conveyed, and other meta-data tags may be used alternatively to or in addition thereto in other embodiments.

Furthermore, the structured document may be linked (i.e., associated) with the program, either as one complete document containing one or more segments of the supplementary content, or as a document having only a single segment of the supplementary content. In the latter case, two or more such documents are used to compose the entire supplementary content 214 with each document is linked to a corresponding segment of the program content. The supplementary content 214, in this embodiment, includes both the supplementary content associating with the program content and identifying information (e.g., "Sponsor ID") in XML meta-data.

The following is an example of a structured document embodying an example of a supplementary content:

```
<?XML V = "1.0"?>
<DecoderId>1234405660567605</DecoderId>
<DocumentTitle>Test3</DocumentTitle>
<DocumentSize>221</DocumentSize>
<Akey>0001</Akey>
<Document>
<ContentType> Print</ContentType>
<language>en-us</language>
<Description>
<![CDATA[_%-12345X@PJL ENTER LANGUAGE=MIME
Content-Type: application/vnd.pwg-multiplexed;
type=application/vnd.pwg-xhtml-print+xml
CHK 1 379 LAST
Content-Type: application/vnd.pwg-xhtml-print+xml
Content-Location: test2.htm
<?xml version="1.0" encoding="UTF-8"?>
<!DOCTYPE html PUBLIC "-//PWG//DTD XHTML-Print
1.0//EN"
"http://www.xhtml-print.org/xhtml-print/xhtml-
print10.dtd">
<html xmlns="http://www.w3.org/1999/xhtml" >
<head>
<title>test</title>
</head>
<body>
abcdefghijklmnopqrstuvwxyz
</body>
</html>
```

-continued

```
CHK 0 0 LAST
   _%-12345X]]>
</Description>
</Document>
```

This structured document is inserted into the VBI lines by the inserter 220. The structured document consists of two portions, a meta-data portion and a data portion of the supplementary content. In this example, the data portion is enclosed by the begin tag "<![CDATA" and end tag "]]>" with the rest of the portion being the meta-data portion described as follows.

Tag 1: <?XML V="1.0"?>; and Tag 2: <DecoderId>1234405660567605 </DecoderId>. Tag 1 is used to indicate the beginning of the structured document. Tag 2 indicates the identification of the specific (intended) recipient of the specific contents. The identification consists of a 16 digits unique identification. With this identification, the receiving supplementary decoder can be identified and the supplementary decoder is prompted to decrypt the encrypted specific contents using its unique private key.

Tag 3: <DocumentTitle> Test3 </DocumentTitle>
Every structured document has a unique document title. The value of tag 3 is used to distinguish one document from another during broadcasting.

Tag 4: <DocumentSize> 221 </DocumentSize>
The value of tag 4 indicates the size of the data portion in bytes in hexadecimal. This is not the size of the structured document. In this example, the data portion is printable and is presented in ASCII text. It is also possible to use other formats such as postscript, pdf, and the like document formats. The data portion can also be in the form of binary data and non-printables.

Tag 5: <Akey> 0001 </Akey>
"Akey", in this example, refers to access key. The supplementary content processor (such as the one shown in FIGS. 3A and 4) decodes the structured document only when the value of tag 5 is a known or recognized value. Thus, for structured documents that are meant for general access by the public, the "Akey" value would be one which is assigned as such, for example, "0001" as in this example.

Tag 6: <Document>; and Tag 7: <ContentType> Print </ContentType>. Tag 6 indicates the beginning of the details of the data portion. The structured document can have multiple <Document> tags to indicate different contents. Tag 7 indicates the type of content, for example, whether it is a text message, gift voucher, audio clip, video clip, or a combination thereof. For multiple <Document> tags, each <Document> tag may be accompanied by a <ContentType> tag to indicate the nature of the content, The <ContentType> tag is used by the supplementary decoder (at the receiver end) to determine which application is needed for extracting the content.

Tag 8: <language>en-us</language>; and Tag 9:<PageSize> 221 </PageSize>. Tag 8 indicates the language of the data portion (printable content in this example). This information is displayable on the screen of the television or the display of the supplementary content processor. The value of tag 9 indicates the size of the data portion of the page in consideration. In this example, the size of the document and the page is the same as there is only one page. In multiple page documents, the size of the page would be smaller than the size of the document.

Tag 10: <Description>, Tag 11: </Description>; and Tag 12: </Document>. Tags 10 and 11 enclose the data portion. Tag 12 indicates the end of the document (segment) details.

Referring back to FIG. 2A, the inserter 220 adds application level forward error correction (FEC) to the supplementary content 214 and thereafter embeds the treated supplementary content 214 in the non-program portion (i.e. VBI in the case of a television AV signal) of the AV signal 216. The output from the inserter 220 is a data-augmented AV signal 222 that is fed to an MPEG2 Encoder 223 and then to the RF module 224. The RF module 224 channel codes the data-augmented AV signal 222 before converting it to an intermediate frequency and finally to an RF broadcast signal for broadcasting. The RF broadcast signal is broadcast using the transmitter 226 via one of the transmitting means described in the foregoing.

In DVB standards, the data-augmented AV signal 222 is broadcast in MPEG2 transport stream format and the like digital formats. Thus, an MPEG2 Encoder 223 is provided to converted the data-augmented AV signal 222 output from the inserter 220 into an MPEG2 stream before feeding the MPEG2 stream to the RF module 224 for further signal conditioning.

Referring to FIG. 2B in which the corresponding method 250 of providing the data-augmented AV signal is illustrated. Initially at step 252, the inserter 220 receives streams of AV signal (containing a program content) 216 of a broadcast program. In one embodiment, the program content typically includes a recorded audio/video of the broadcast program and is provided along with supplementary content identifying information, sponsor/advertiser information, or other program related contents. In another embodiment, however, such as live televised sports programs, the program content is produced in real-time. Thus, the corresponding supplementary content 214 (for example, the batting average of a currently playing baseball player which may be prepared and stored in the content server 212), is supplied to the inserter 220 synchronously with the live program content.

In step 254, the inserter 220 receives the supplementary content 214 associated with the program content from the content server 212. Subsequently in step 256 (also referring to FIG. 2A), the supplementary content 214 is combined with or inserted into the VBI of the AV signal 216 to provide the data-augmented AV signal 222. Additional processes may be used to complement the combining processes at the inserter 220. For example, a forward error correcting algorithm may be applied to the supplementary content 214 to improve transmission reliability. It is apparent that other coding algorithms may be used in alternative embodiments.

In an embodiment, the provision of the supplementary content 214 can be synchronized with the appropriate program content segment using the synchronization signal 218. Thus, the combining process involves synchronizing segments of the supplementary content 214 with the vertical blanking intervals of the AV signal 216 portions which carry the corresponding segments of the program content. In an alternative embodiment, the content server 212 can be triggered to provide the supplementary content 214 by the inserter 220 or at a pre-determined schedule. In yet another embodiment, the content server 212 can be linked to a video server (not shown) which provides the AV signal 216. Thus, the video server can instruct the content server 212 when to provide the supplementary content to the inserter 220.

The data-augmented AV signal 222 retains the signal waveform/format of the original television AV signal 216 and can therefore be processed by a television set in the conventional manner. In step 258 (also referring to FIG. 2A), the data-augmented AV signal 222 is provided to the MPEG2 Encoder 223 and then to the RF module 224 for channel coding and modulation with a carrier signal to provide an RF broadcast signal. Subsequently, the RF broadcast signal is broadcast to receivers using the transmitter 226.

Figure 3A:
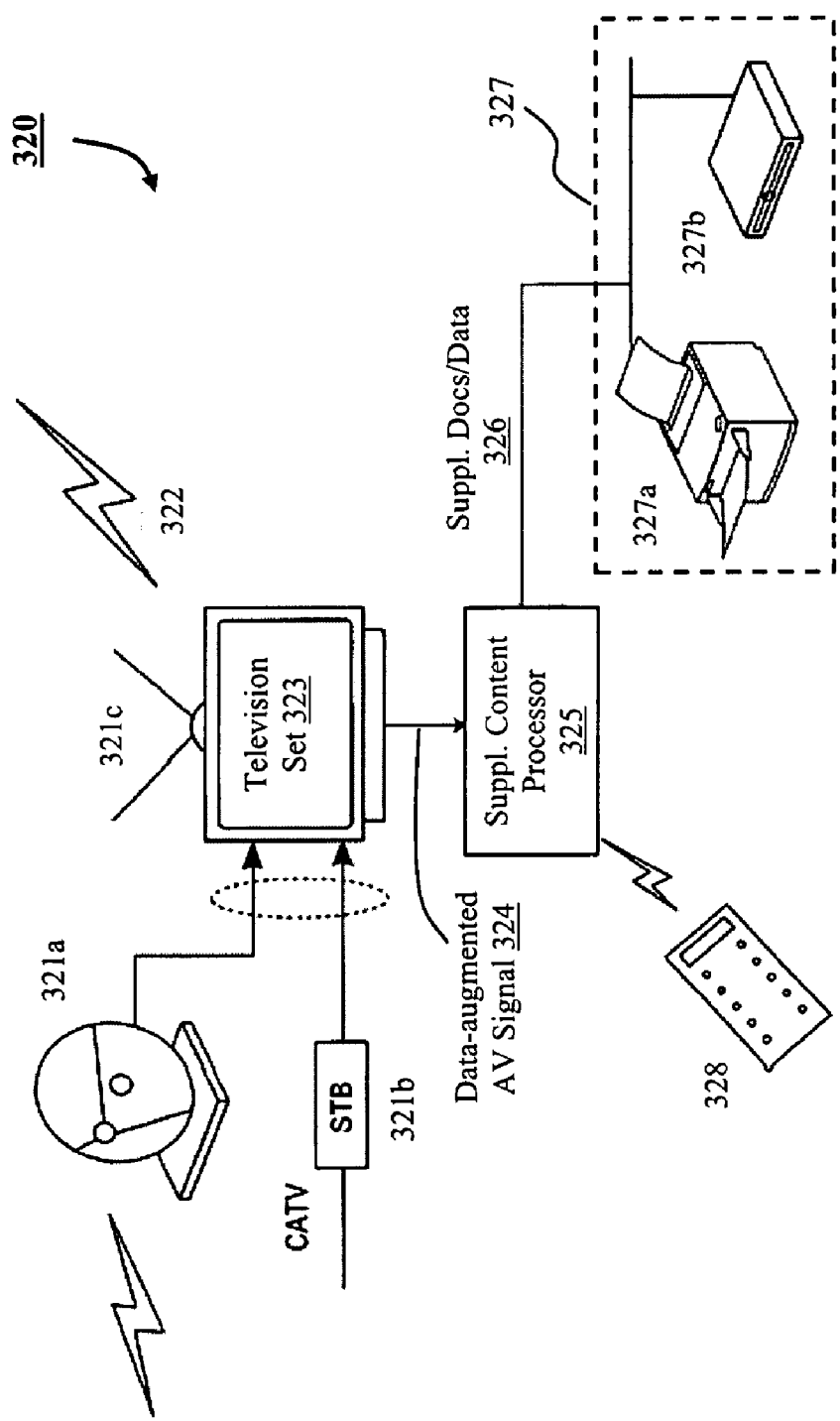
FIG. 3A illustrates a system for processing a data-augmented AV signal in accordance with an embodiment of the present invention.
Figure 3B:
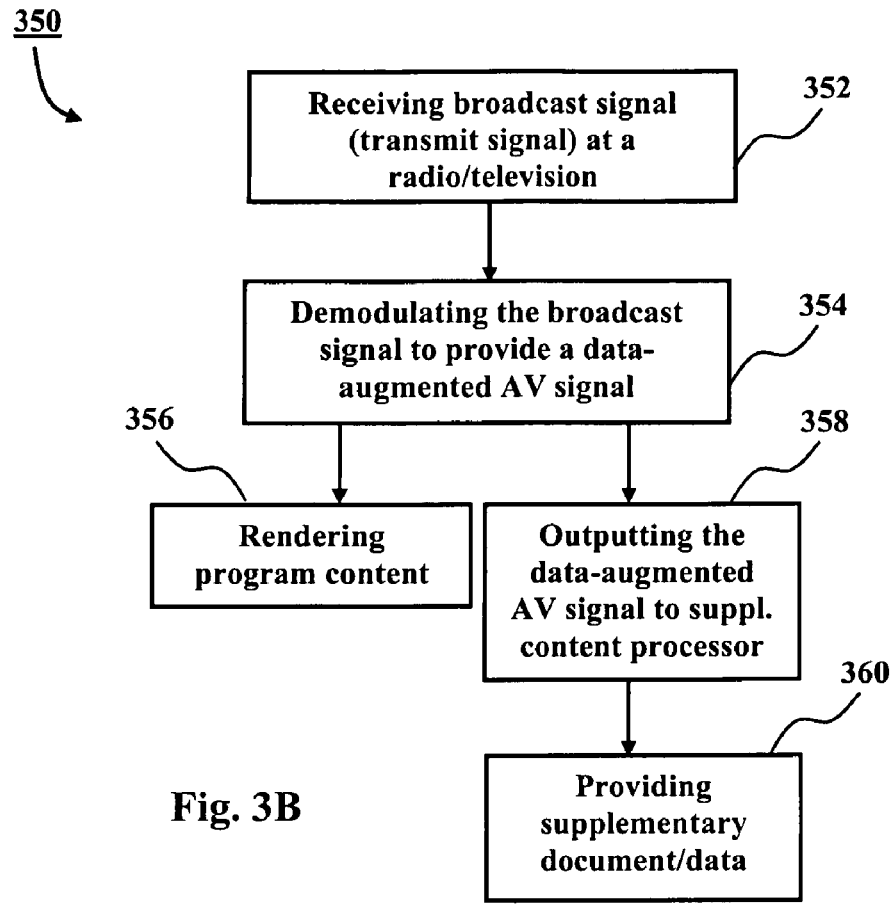
FIG. 3B illustrates a method of processing a data-augmented AV signal in accordance with an embodiment of the present invention.

An embodiment of a system 320 and corresponding method 350 for processing data-augmented AV signals are respectively illustrated in FIGS. 3A and 3B. Referring first to the system 320 illustrated in FIG. 3A, the system 320 includes a receiving means 321 (a, b, c), a conventional television set 323, a supplementary content processor 325, a content output means 327 (a, b), and an optional a remote controller unit 328. For instance, receiving means includes a satellite receiver 321a, a set top box 321b, and a television aerial 321c, each of which is adapted to receive RF broadcast signal 322 which can be processed by the conventional television set 323 in the conventional manner. The television set 323 has electronic circuits to perform the reverse processes that take place at the broadcasting end. In the case of a satellite transmission, a satellite set-top box (not shown) is also provided for performing the reverse processes. This include demodulating, channel tuning, and converting the received digital signals to analog signals for the conventional television set 323. The television set 323 demodulates the RF broadcast signal 322 to provide a data-augmented AV signal (i.e. base-band signal) 324 which contains the program content and the supplementary content.

The conventional television set 323 then renders the program content on the television screen in the conventional manner. At the same time, the data-augmented AV signal 324 is output to the supplementary content processor 325; for example, via a video output port of the conventional television set 323, where the supplementary content is extracted from the VBI portion of the video.

The supplementary content processor 325 (hereinafter also referred to as Supplementary Decoder) further processes the extracted supplementary content to provide supplementary data 326 which are associated with the program content being rendered on the conventional television set 323. Subsequently, the supplementary data 326 can be output to a printer 327a for hardcopy printout or can be stored in a data storage device 327b. The output device 327 can also include other electronic devices such as mobile phones, PCs, and PDAs.

In an embodiment, the remote controller unit 328 (the functionality of which may be incorporated into a remote controller unit of the conventional television set 323) can be used to control the supplementary data downloading process at the supplementary content processor 325. In an embodiment, the remote controller unit 328 is operable to instruct the supplementary content processor 325 to process the data-augmented AV signal 324 whereby the supplementary content 326 is delivered to one or more of the output devices 327. In this manner, the viewer can download supplementary content concurrently with little or no disruption to the program viewing experience.

A method 350 of processing a data-augmented AV signal using the system 320 of FIG. 3A is shown in FIG. 3B. Initially at step 352, the RF broadcast signal 322 is received (or recovered by the receiving means 321). The RF broadcast signal 322 is in the format of an original television broadcast signal and thus, can be processed by the conventional television set 323 in the conventional manner. The RF broadcast signal 322 contains the data-augmented AV signal. In step 354, a demodulating circuit (not shown) of the television set 323 is used to demodulate the RF broadcast signal 322 (in the conventional manner) to provide a base-band signal (i.e. the data-augmented AV signal 324) which contains the program content and the supplementary content. The program content is subsequently rendered on the television screen in the conventional manner in step 356. At almost the same time, the data-augmented AV signal 324 can be output to the supplementary content processor 325 for extracting and processing the supplementary content in step 358.

The supplementary content processor 325 extracts the supplementary content from the data-augmented AV signal and assembles the supplementary content into one or more printable supplement documents or data 326. Further details of the supplementary content processor 325 are described below with reference to FIG. 4. The supplementary documents or data 326 are delivered to output devices 327, which in two example embodiments include a printer 327a and a data storage device 327b in step 360. It should be noted that other output devices may be used alternatively or in addition to printer and/or storage devices. Connection between the supplementary content processor 325 and the output devices 327 may be realized through various connection means, such as USB, IEE1394, SCSI, parallel connections, wireless connections (e.g. Bluetooth, WiFi, Infrared), and the like communication means.

Radio Data-Augmented Signal

The system 210 and method 250 of FIGS. 2A and 2B can also be used to provide and process radio signals augmented with data. As an example, a digital audio broadcasting (DAB) system employs a non-program audio signal component, commonly known as a program associated data (PAD) channel, which can be used as the vehicle for transporting the supplementary content. In such an embodiment, the system 210 and corresponding method 250 can be used in substantially the same manner, as described in the foregoing, for receiving and processing a DAB broadcast signal of a DAB program and supplementary content associating with the DAB program. The supplementary content is provided by the content server 212. The inserter 220 which is adapted for processing the DAB broadcast signals is used to insert the supplementary content into the PAD channel of the DAB signal, thereby forming a (DAB) radio data-augmented signal. The radio data-augmented signal is subsequently converted into a radio broadcast signal for broadcasting via conventional transmitting means, example embodiments include satellite, cable, and tower transmitters. The specific modulation process is a known art and is governed by the DAB broadcasting standards.

Figure 3C:
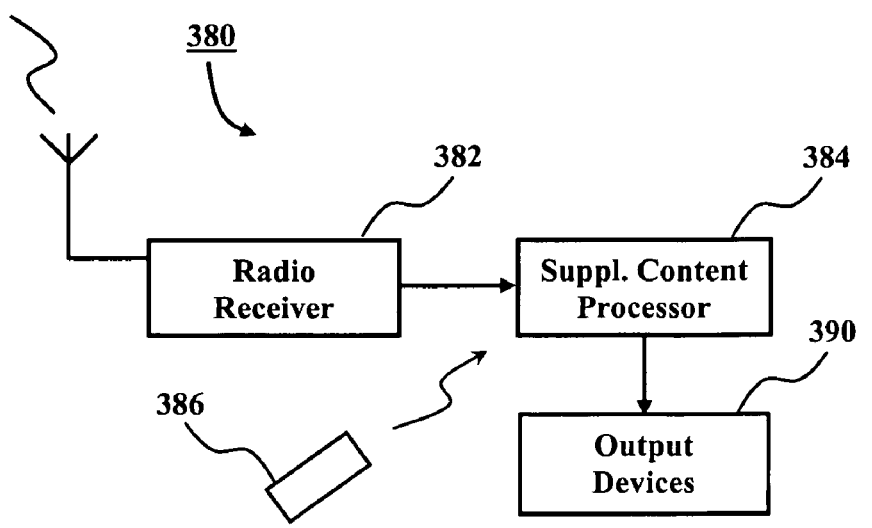
FIG. 3C illustrates a radio system for processing a radio data-augmented signal in accordance with an embodiment of the present invention.

Likewise, similar system and method to those of FIGS. 3A and 3B may be used for receiving and processing the radio data-augmented signal. In an embodiment, a radio system 380 for receiving and processing the radio broadcast signal of the aforementioned DAB is shown in FIG. 3C. The radio system 380 includes a conventional radio receiver 382 for receiving the radio broadcast signal. Additionally, the conventional radio receiver 382 includes a demodulator or other such circuitries operable to demodulate the radio broadcast signal to provide a radio base-band signal (i.e. the radio data-augmented signal) containing the DAB program and supplementary content. The radio system 380 further includes a supplementary content processor 384 for receiving the base-band signal and extracting the supplementary content. The supplementary content is then assembled to provide one or more supplement documents or data, which, for instance, by using a remote controller unit 386, can be delivered to an output device 390. The output device 390 can be a printer, data storage device, PDA, PC, and the like electronic devices.

Figure 4:
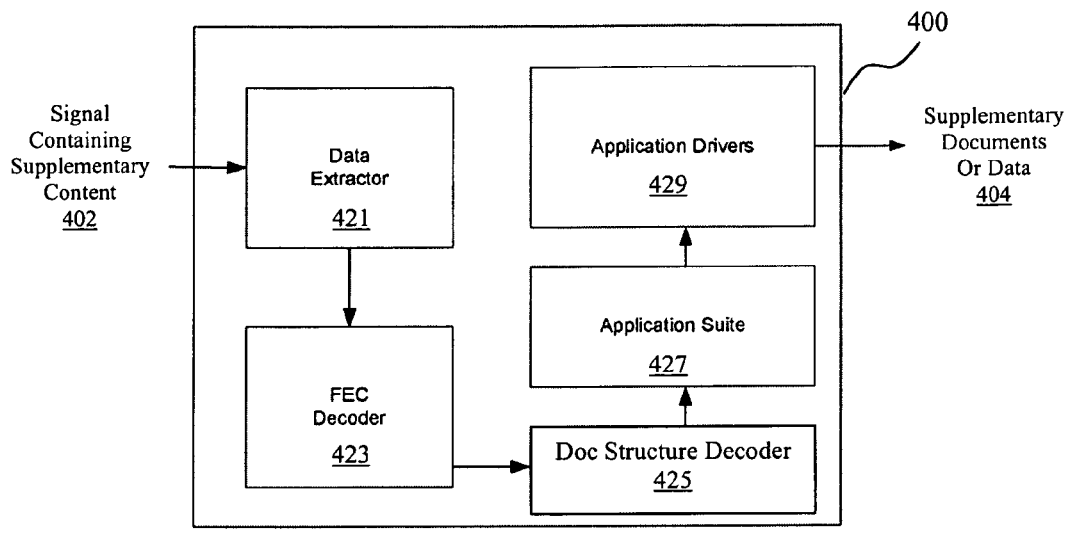
FIG. 4 illustrates a functional block diagram of a supplementary content processor shown in FIG. 3A in accordance with an embodiment of the present invention.

FIG. 4 illustrates a functional block diagram of a supplementary content processor 400 (such as the supplementary content processor 325 shown in FIG. 3A) that includes a data extractor 421, an optional forward error correction (FEC) decoder 423, a document structure decoder 425, an application suite 427, and associated application drivers 429. During operation, streams of base-band signal 402 containing the supplementary content is provided to the supplementary content processor 400. The data extractor 421 extracts embedded supplementary content, for example, applets or programming, from the base-band signal 402.

Once the supplementary content is extracted from the base-band signal 402, the supplementary content is put through the FEC decoder 423 to correct any errors introduced by the transmission channel during broadcasting. The output from the FEC decoder 423 is subsequently fed to the document structure decoder 425.

In an embodiment, the supplementary content (which may include more than one segment, as described above) is recovered in the form of structured data such as XML-formatted data. In such an embodiment, the document structure decoder 425 is employed to decode the meta-data, or other such similar data used in alternative structured document. The decoded data is provided to the application suite 427 which further assembles the decoded data into the desired format (i.e. data 404) for a particular application. The application drivers 429 interface with a particular output device 327, and may be incorporated within the application suite 427 in an alternative embodiment. The appropriately formatted data 404, referred to in the foregoing FIG. 3A as supplementary documents or data 326, is subsequently provided to one or more output devices 327.

The supplementary content processor 400 may further include a remote controller interface module (not shown) to which various command signals can be issued for instructing the supplementary content processor 400 to perform one, some, or all of the aforementioned supplementary content processor functions. As an example, the supplementary content processor 400 continually processes streams of supplementary content segments as described in relation to the content server 212 of FIG. 2A. Each supplementary content segment includes supplementary content corresponding to, and synchronized with, a segment of the program content. When the viewer is presented with a topic that the viewer desires to acquire more information on, the viewer actuates the appropriate buttons on the remote controller unit. The signal produced thereby in turn activates the supplementary content processor 400 to generate the supplementary document or data 404 for output to one or more of the output devices. In this manner, the corresponding content segment can be downloaded (as a printed or stored electronic document, for instance) conveniently with minimal disturbance to the viewing experience.

The systems and methods described in the foregoing can be used for delivering specific contents to specific recipients/audience as described hereinafter with reference to FIGS. 5-6. FIGS. 5A and 5B respectively illustrate a system 500 and method 550 for delivering specific contents to specific recipients using a broadcast program augmented with multiple supplementary contents, wherein each supplementary content is for containing information relating to a segment of a broadcast program as well as specific contents intended for specific recipients.

Figure 5A:
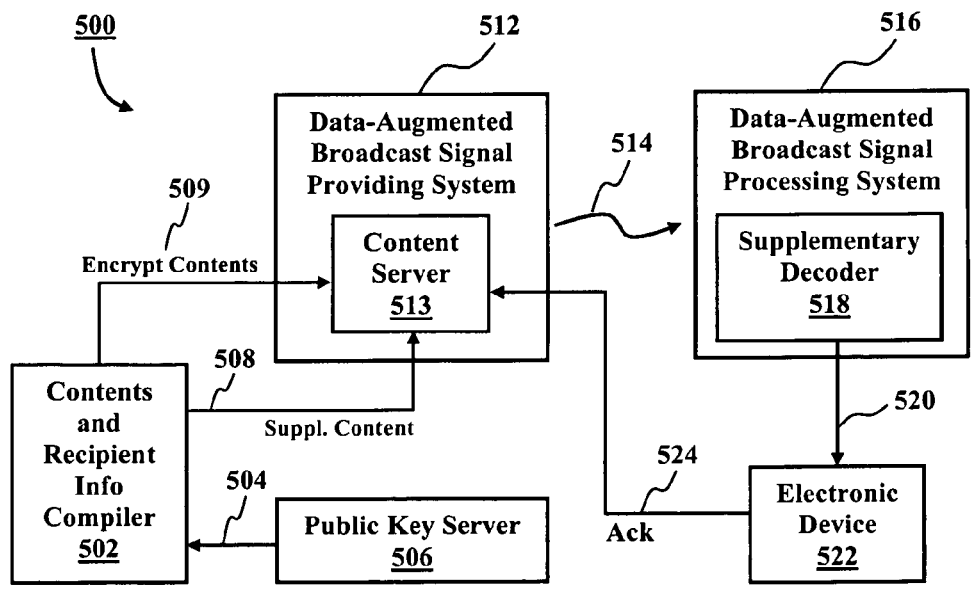
FIG. 5A illustrates a system for delivering specific contents to a specific recipient in accordance with an embodiment of the present invention.
Figure 6:
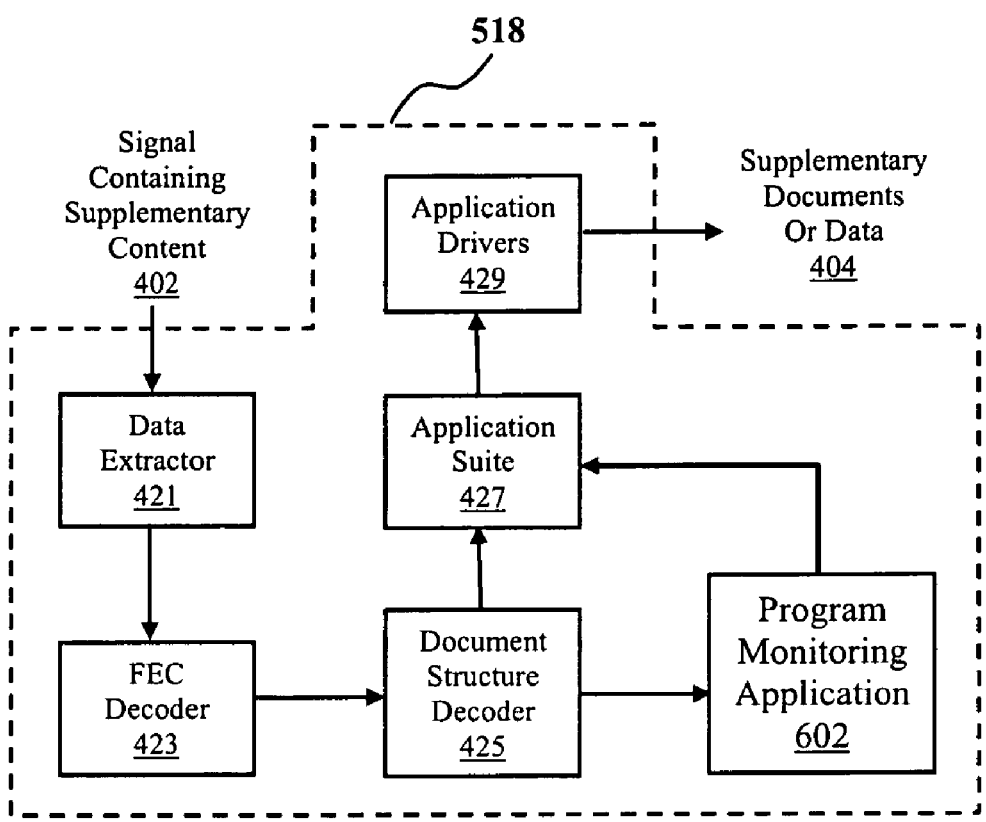
FIG. 6 illustrates a functional block diagram of a supplementary decoder of FIG. 5A in accordance with an embodiment of the present invention.

The system 500 as shown in FIG. 5A according to an embodiment includes a contents and recipient information compiler 502, a public key server 506, a data-augmented broadcast signal providing system 512, a data-augmented broadcast signal processing system 516, and an electronic device 522 for receiving the contents. In this embodiment, a sender would approach a broadcaster (or a message center) with a message (specific contents) to be sent to a recipient along with the recipient information. The contents can include gift-vouchers, text messages, video clips, audio clips, photos, and the like information and data or a combination thereof. The recipient information includes a unique identity of a supplementary decoder of the recipient.

Upon receiving the (specific) contents and recipient information, the contents and recipient information compiler 502 encodes the contents and generates a supplementary content (e.g, a structured document with encrypted message). The encoding process involves retrieving a public key 504 corresponding to the identity of the supplementary decoder of the recipient from a public key server 506 and encrypting the contents using the public key 504. The public key server 506 is a secure server managed by the broadcaster or a separate agent. The public key server 506 contains a list of public keys, wherein each public key associates with a specific supplementary decoder identification of a recipient. In an alternative embodiment, the public key may be provided by the sender. Thus, the need for a public key server 506 is alleviated. At the supplementary decoder, a private key corresponding to the public key 504 is provided which is used in decrypting the encrypted contents.

In an embodiment, when the contents are encrypted using the public key 504 to provide an encrypted contents 509, the contents and recipient information compiler 504 generates a supplementary content 508 containing the encrypted contents 509 as well as the identification of the supplementary decoder of the recipient and forwards the supplementary content 508 to the data-augmented broadcast signal providing system 512. Specifically, the supplementary content 508 is provided to a content server 513 of the data-augmented broadcast signal providing system 512. As described in the foregoing, the identification of the supplementary decoder is conveyed in the meta-data portion of the supplementary content 508 using the <DecoderId> tag, and the encrypted contents is conveyed in the data portion of the supplementary content 508.

In another embodiment, the contents and recipient information compiler 502 may send the encrypted contents 509 along with the identification of the supplementary decoder to the content server 513 without first constructing the supplementary content 508. At the content server 513, the encrypted contents 509 and the identification of the supplementary decoder of the recipient are embedded into a supplementary content which may contain other information, such as broadcast program related information.

The data-augmented broadcast signal providing system 512 and the data-augmented broadcast signal processing system 516 are similar in makeup to the respective systems shown in FIGS. 2A and 3A (and 3C) as described in the foregoing. Information or data associating with a broadcast program is provided as supplementary contents to the data-augmented broadcast signal providing system 512. Each supplementary content is combined with the broadcast program to provide a data-augmented AV signal which is subsequently modulated with a carrier signal to provide a transmit signal 514 for broadcasting in the conventional manner (i.e. television or radio broadcasting).

At the receiving end, the transmit signal 514 is received by the data-augmented broadcast signal processing system 516. The data-augmented broadcast signal processing system 516 demodulates the transmit signal 514 to provide a base-band signal (i.e. the data-augmented AV signal) containing the program content and the supplementary content. The program content is rendered and at substantially the same time, the base-band signal is output to a supplementary decoder 518 where the supplementary content is extracted and further processed.

In this embodiment, the supplementary decoder 518 is similar in makeup to the supplementary content processor 400 of FIG. 4. The supplementary decoder 518 has a unique decoder identifier and a private key that corresponds to the public key 504. The supplementary decoder 518 further includes a program monitoring application 602 as shown in FIG. 6. The program monitoring application 602 is coupled to the document structure decoder 425. In an embodiment, the program monitoring application 602 can be integrated with the document structure decoder 425. One of the functions of the program monitoring application 602 is to scan the meta-data of the supplementary content for program names and identity of the supplementary decoder 518. In an embodiment, if the identity of the supplementary decoder 518 is found, the program monitoring application 602 proceeds to retrieve the encrypted contents 509 and decrypts the encrypted contents 509 using the private key to retrieve the (transmitted) contents.

In an embodiment, the supplementary decoder 518 alerts the recipient of the availability of the contents. This can be achieved by displaying a text message on a display (not shown) of the supplementary decoder 518 or on the screen of the television (if the receiver is a television set). Alternative alerts such as blinking lights and the like can also be used to inform the recipient. In response, the recipient, who is equipped with the electronic device 522, may request the contents to be delivered to the electronic device 522. The electronic device 522 is coupled to the supplementary decoder 518 via a communication link 520. The electronic device 522 can be a mobile phone, PDA, a PC, a printer, or the like electronic devices. Accordingly, the link 520 can be a wireless connection such as Bluetooth, WiFi, WLAN, or wired connection such as USB, FireWire, serial, or parallel connections. The electronic device 522 is registered with the supplementary decoder 518 in order to receive the contents. However, not all electronic devices registered with the supplementary decoder 518 need to receive the contents every time a command is given. The supplementary decoder 518 can be provided with a user option to select which of the electronic devices registered therewith should receive the contents and only sends the contents to the electronic devices specified therein. Further, the supplementary decoder 518 can be provided with an application that includes an application logic to determine which of the registered electronic devices should be forwarded which kind of contents. The application logic can encompass forwarding all contents to all registered devices to only sending contents based on user preference or prior user requests.

The electronic device 522 provides the interface between the recipient and the contents. The electronic device 622 can be provided with a simple application for browsing and editing the contents. If the electronic device 522 is a printer, and the contents are text or graphic based, a hard copy printout can be obtained.

In an embodiment, the encrypted contents 904 may be re-broadcast if an acknowledgement is not received after a pre-determined period. As such, upon receiving the contents, the recipient may provide an acknowledgement 524 of the receipt of the contents in order to stop the re-broadcasting of the encrypted contents 904. Acknowledgement can be sent to either the content server 513 or the contents and recipient information compiler 502. The acknowledgement 524 may be sent by using a communication infrastructure of the electronic device 522. For example, if the electronic device 522 is a mobile phone, the acknowledgement 524 can be sent using the telecommunication infrastructure of the mobile phone in the form of voice call or SMS. If the electronic device 522 is a PDA or PC, the acknowledgement 524 can be sent using the Internet link of the PDA or PC.

In an alternative embodiment, an acknowledgement can also be sent to the sender. In this case, at the time of providing the specific contents, the sender can also provide a contact number for acknowledgement. Such contact number can be a mobile phone number, fax number, email address, or a land line. Subsequently, the contact number can be embedded into the supplementary content and retrieved and presented to the recipient at the receiving end. This can be achieved by adding an acknowledgement tag, for example, <SenderMobileId>987654321 </SenderMobileId>, in the structured document schema. This information can be embedded in the meta-data portion of the structured document.

Figure 5B:
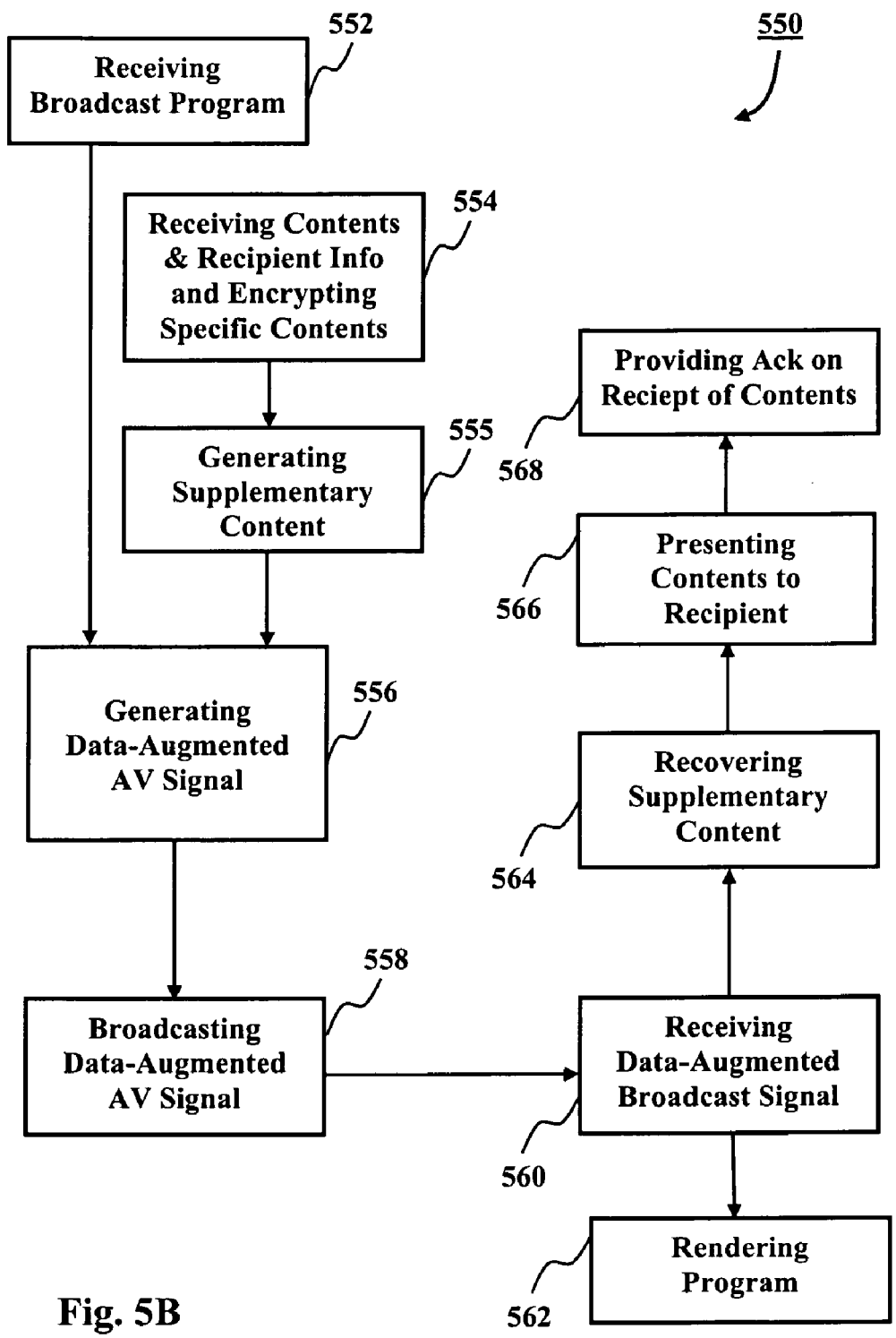
FIG. 5B illustrates a method of delivering specific contents to a specific recipient in accordance with an embodiment of the present invention.

The method 550 of delivering specific contents to specific TV/Radio users using a broadcast program augmented with multiple supplementary contents according to an embodiment is shown in FIG. 5B. The method 550 includes receiving an AV signal of a broadcast program in step 552. In an embodiment, the broadcast program is a television broadcast program. The AV signal has a non-program portion and a program portion which contains the content of the broadcast program. In another embodiment, the broadcast program is a radio broadcast program. The content of the broadcast program can be any information such as movies, news, sports, current affairs, and the like information typically broadcast. In step 554, specific contents and recipient information for which the specific contents are intended are received. The specific contents are subsequently encrypted to provide encrypted contents. The process of encrypting the specific contents involves obtaining a public key corresponding to the recipient information and encrypting the specific contents with the public key to secure the specific contents so that unauthorized persons cannot access it. Broadcasters can use a RSA cryptographic algorithm for public key encryption. In an embodiment, the public key can be obtained from a secured centralized public key server. In step 554, other information or contents relating to the broadcast program can also be provided. However, these contents are not encrypted as the contents are intended for general recipients.

The encrypted contents and other contents, if any, are structured as a supplementary content in step 555. In an embodiment, the supplementary content is in the form of a XML-type document (structured document) which includes a meta-data portion and a data portion as described in the foregoing. In a multiple supplementary contents environment, the different supplementary contents are differentiated by providing identifying information in the meta-data portion. For example, in an embodiment where monitoring broadcast program viewing by audience members is desired, the supplementary content includes a tag for identifying the broadcast program in the meta-data portion. In step 555, the recipient information is placed in the meta-data portion in the form of a <DecoderId> tag, and the encrypted contents and other contents (if any) are placed in the data portion of the supplementary content.

The supplementary content is combined with the non-program portion (e.g. VBI) of the AV signal of the broadcast program to provide a data-augmented AV signal in step 556. The data-augmented AV signal is subsequently modulated with a carrier (broadcast) signal to provide a transmit signal for broadcasting to conventional receivers in step 558. The data-augmented AV signal has the same format as the original AV signal. Thus, the data-augmented AV signal can be treated, broadcast and received in the same manner as a conventional television (or radio) broadcast signal.

In an embodiment, the supplementary content is inserted into the VBI of the AV signal as it is received in step 556. The supplementary content is combined with a specific non-program portion segment of the AV signal to closely reside with the specific program-portion segment of the broadcast program. For example, if a supplementary content contains information which is closely related to a segment of the broadcast program, the supplementary content is combined with the non-program portion adjacent to the program portion of the related segment of the broadcast program. In another embodiment, the supplementary content is combined with the broadcast program at a pre-determined interval. Thus, there is synchronization between the segments of the broadcast program with the supplementary contents. In this way, at the receiver end, the audience is presented with the option to download the supplementary content at the appropriate time when the audience is most influenced by the program content segment.

At the receiver end, the transmit signal is received by a conventional receiver in step 560. The conventional receiver processes the transmit signal in the conventional manner. Typically, step 560 includes demodulating the transmit signal to provide a base-band signal (i.e. the data-augmented AV signal) which contains the program content and the supplementary content. In the case where the transmit signal is a radio signal, the conventional receiver is a radio receiver and it retrieves the program content from the base-band signal and renders the program content to the listener in audio form. In the case where the transmit signal is a television signal, the conventional receiver is a television receiver and it renders the program content on the television screen. The act of rendering the program content is performed in step 562, a process well known in the art.

At almost the same time of rendering the program content, the base-band signal is output to a supplementary decoder in step 564. The supplementary decoder retrieves the supplementary content from the base-band signal as described in the foregoing with reference to FIGS. 3A, 4, 5A, and 6. In step 564, the supplementary content is further processed by the program monitoring application 602 as described in the foregoing with reference to FIGS. 5A and 6. The program monitor application 602 scans the meta-data of the supplementary content for program names and identity of the supplementary decoder 518. In an embodiment, if the identity of the supplementary decoder 518 is found, the program monitoring application 602 proceeds to retrieve the encrypted contents and decrypts the encrypted contents using the private key to retrieve the (transmitted) contents. The contents are subsequently delivered to the intended output device in step 566.

In an embodiment, upon detecting the identity of the supplementary decoder 518 and before decrypting the encrypted contents, the supplementary decoder 518 alerts the recipient of the availability of the contents. This can be achieved by displaying a text message on a display (not shown) of the supplementary decoder 518 or on the screen of the television (if the receiver is a television set). Alternative alerts such as blinking LEDs on supplementary decoder, and the like can also be used to inform the recipient. In response, the recipient, who is equipped with the electronic device 522, may request the contents to be delivered to the electronic device 522. Upon receiving the request from the recipient, the supplementary decoder 518 decrypts the encrypted contents. The decrypted contents are subsequently delivered to the electronic device 522 for rendering the contents to the output device in step 566.

In the foregoing embodiments, the encrypted contents can be rebroadcast at a regular or pre-determined interval until an acknowledgement is received from the recipient. Thus, to avoid re-broadcasting the encrypted contents, an acknowledgement of the receipt of the contents can be provided in step 568. In an embodiment, the acknowledgement can be sent to the broadcaster. In another embodiment, in the case where the broadcaster only broadcast the contents once, the acknowledgement can be sent to directly to the sender using a contact number provided by the sender. Thus, if an acknowledgement is not received by the sender after a period of time, the send has the option to approach the broadcaster to broadcast the contents again.

The described processes may be implemented in hardware, software, firmware or a combination of these implementations as appropriate. For example, the processes of modulating and broadcasting signals may be carried out by hardware component encoders, modulators and transmitter systems operable to encode, modulate and broadcast signals at the desired frequency and in the desired format. The described supplementary content processor or supplementary decoder may employ a combination of hardware front-end receiver components operable to additionally demodulate and/or condition the received supplementary content, and firmware/software operable to FEC decode the supplementary content and to store/process the resultant data as well as the output applications and device drivers. In addition, some or all of the described processes may be implemented as computer readable instruction code resident on a computer readable medium (removable disk, volatile or non-volatile memory, embedded processors, etc.), the instruction code operable to program a computer or other such programmable devices to carry out the intended functions.

The foregoing description is presented for purposes of illustration and description. It is not intended to be exhaustive or to limit the invention to the precise form disclosed, and obviously many modifications and variations are possible in light of the foregoing description. The described embodiments are chosen in order to explain the principles of the invention and its practical application to thereby enable others skilled in the art to utilize the invention in various embodiments and with various modifications as are suited to the particular use contemplated. It is intended that the scope of the invention be defined by the claims appended hereto.

The invention claimed is:

1. A method comprising:
   receiving a transmit signal at a receiver, the transmit signal including a program and a supplementary content containing an encrypted content for a recipient and an identity of the recipient;
   demodulating the transmit signal to provide a data-augmented AV signal by the receiver;
   outputting the data-augmented AV signal from the receiver to a decoder and recovering the supplementary content from the data-augmented AV signal by the decoder at substantially the same time the program is rendered at the receiver; and
   retrieving content upon recognizing the identity of the recipient, wherein the content comprises information related to the program, and wherein retrieving the content comprises:
      retrieving the encrypted content from the supplementary content; and
      decrypting the encrypted content using a private key.

2. The method of claim 1, wherein recovering the supplementary content comprises extracting the supplementary content therefrom.

3. The method of claim 2 further comprising:
   providing a message to inform the recipient of the availability of the content by the decoder; and
   furnishing the content to an electronic device of the recipient from the decoder upon receiving a confirmation therefrom.

4. The method of claim 3, wherein furnishing the content comprises transmitting the content to an electronic device in data communication with the decoder; and rendering the content at the electronic device.

5. The method of claim 3 further comprising sending an acknowledgement of the recipe of the content.

6. The method of claim 1 further comprising:
   receiving the content and the identity of the recipient;
   encrypting the content to provide the encrypted content;
   generating the supplementary content and combining the same with an AV signal of the program to provide the data-augmented AV signal; and
   modulating the data-augmented AV signal with a carrier signal to provide the transmit signal for broadcasting.

7. The method of claim 1, wherein the information related to the program comprises receiving at least one of a gift voucher, text message, music, game, photo, audio clip, ringtone, song, and a video clip.

8. The method of claim 6, wherein encrypting the content comprises retrieving a public key as indicated by the identity of the recipient from a server and encrypting the content with the public key.

9. The method of claim 6, wherein combining the supplementary content with the AV signal comprises inserting the supplementary content into a non-program portion of the AV signal, wherein the AV signal being a television AV signal, the non-program portion is a vertical or horizontal blanking interval of the AV signal, wherein the AV signal being a digital audio broadcast, the non-program portion is a program associated data channel.

10. The method of claim 6, wherein generating the supplementary content comprises structuring the encrypted content and identity of the recipient in an XML format.

11. The method of claim 6 further comprising re-broadcasting the transmit signal.

12. A system comprising:
   a receiver for receiving a transmit signal and demodulating the same to provide a data-augmented AV signal, the transmit signal containing a program and a supplementary content, the supplementary content containing an encrypted content for a recipient and an identity tag for identifying the recipient; and
   a decoder coupled to the receiver for receiving the data-augmented AV signal and recovering the supplementary content therefrom at substantially the same time the program is rendered at the receiver,
   the decoder includes a program monitoring application for retrieving the encrypted content from the supplementary content and decrypting the encrypted content upon recognizing the identity tag, wherein the decrypted content comprises information related to the program.

13. The system of claim 12, wherein the receiver comprises one of an analog television, a digital television, and a digital radio.

14. The system of claim 12, wherein the decoder comprises a unique identity and a private key and the program monitoring application recognizes the identity tag by matching the identity tag with the unique identity and decrypting the encrypted content using the private key.

15. The system of claim 12 further comprising an electronic device in data communication with the decoder for receiving and rendering the decrypted content.

16. The system of claim 15, wherein the electronic device comprises at least one of a printer, mobile phone, PC, and a PDA.

17. The system of claim 12 further comprising: a compiler for receiving a content and the identity tag and encrypting the content to provide the encrypted content;
 a content server coupled to the compiler for receiving data there from and for providing the supplementary content;
 an inserter coupled to the content server for combining the supplementary content with an AV signal of the program to provide the data-augmented AV signal; and a modulator for modulating the data-augmented AV signal with a carrier signal to provide the transmit signal for broadcasting.

18. The system of claim 17 further comprising a public key server coupled to the compiler for providing a public key corresponding to the identity tag thereto for used by the compiler during the encrypting process.

19. The system of claim 17 further comprising a synchronizing signal between the content server and the inserter for coordinating the combining process.

* * * * *

UNITED STATES PATENT AND TRADEMARK OFFICE
CERTIFICATE OF CORRECTION

PATENT NO.      : 8,065,742 B2                                        Page 1 of 1
APPLICATION NO. : 11/997904
DATED           : November 22, 2011
INVENTOR(S)     : Rahul Shukla et al.

It is certified that error appears in the above-identified patent and that said Letters Patent is hereby corrected as shown below:

In column 16, line 23, in Claim 7, after "comprises" delete "receiving".

Signed and Sealed this
Fourth Day of December, 2012

David J. Kappos
*Director of the United States Patent and Trademark Office*